June 15, 1954     A. C. THOMSON     2,681,190
HELICOPTER LANDING FIELD
Filed April 19, 1951     2 Sheets-Sheet 1
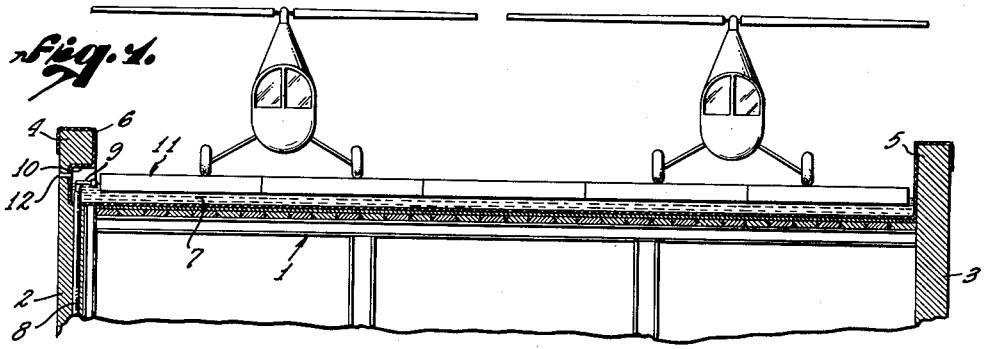
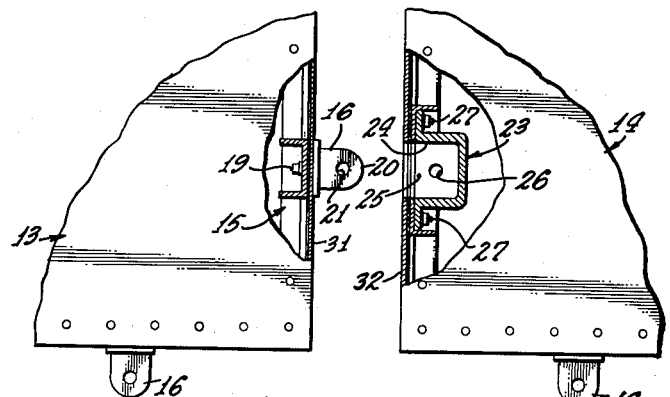
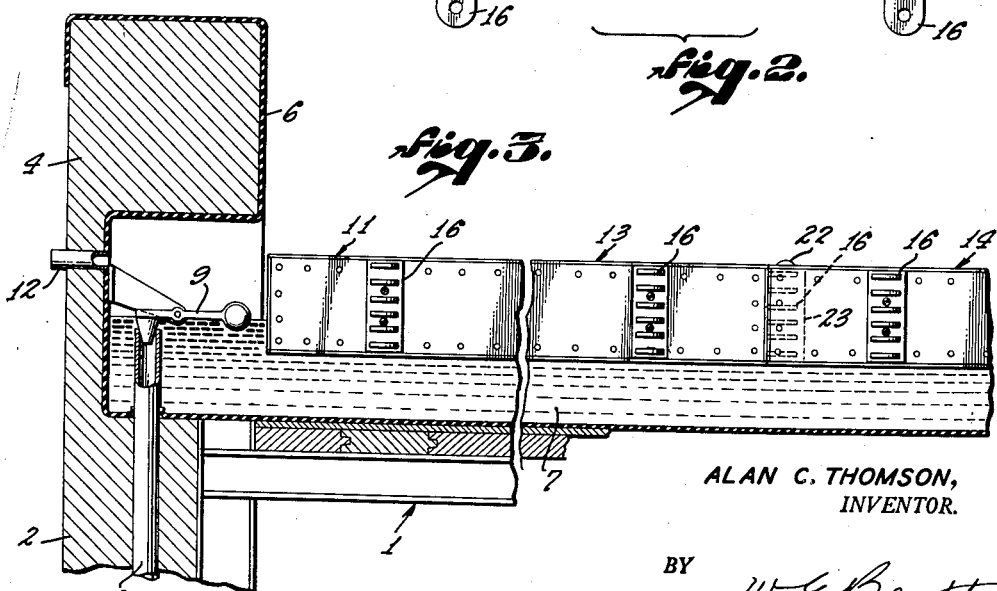
ALAN C. THOMSON,
INVENTOR.
BY
ATTORNEY.

June 15, 1954     A. C. THOMSON     2,681,190
HELICOPTER LANDING FIELD
Filed April 19, 1951     2 Sheets-Sheet 2
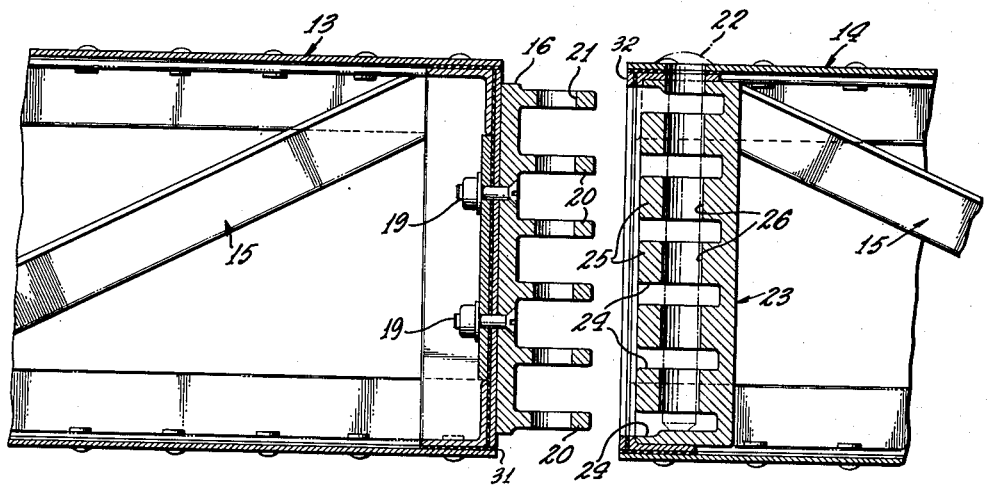
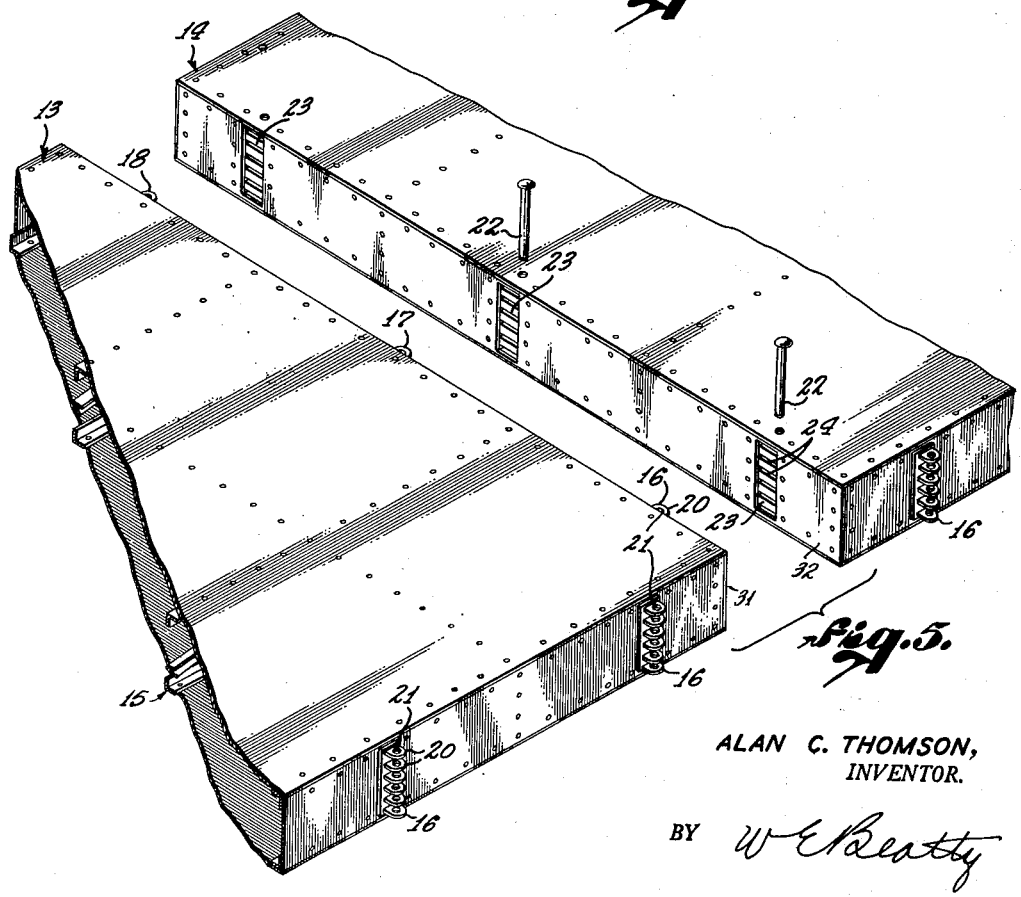
ALAN C. THOMSON,
INVENTOR.
BY *W E Beatty*
ATTORNEY.

Patented June 15, 1954

2,681,190

UNITED STATES PATENT OFFICE 2,681,190

HELICOPTER LANDING FIELD

Alan C. Thomson, Manhattan Beach, Calif.

Application April 19, 1951, Serial No. 221,838

6 Claims. (Cl. 244—114)

The invention relates to a helicopter landing field. Where the ground is available as a landing field, no problem exists. However, in certain cases is is desirable to land a helicopter in a business or residential section having no vacant property suitable for a landing field. While the landing field could be located at some distance, this would involve additional delay and expense in transporting the load of the helicopter from such field to the building in a congested area. An example of this is found in the postal service where mail is distributed from a central office in a large city to other offices in suburban areas. In this case it is desirable to have the suburban landing field as close as possible to the post office and it has been proposed to modify the roof of the post office building, or an adjoining building so that it will serve as a landing field. In the former construction, use is made of multiple layers of material including concrete, in order to distribute the weight or force of the helicopter into the building structure.

An object of the present invention is to reduce the cost and weight of the roof top landing field and increase the ease of manufacture, installation, transportation and repair of the landing field.

This is accomplished by providing the roof of the building with a tank to hold water and by providing a landing field in the form of a float.

The advantage of the present invention will become apparent from the following example. Assume that the helicopter has a gross weight of 10,000 lbs., three wheels having say 25 lbs. per sq. in. of air pressure and a ground contact of about 1 sq. ft. In the previously proposed rigid landing field of concrete, the roof top would be subject to a load of about 3,300 lbs. per sq. ft., and this is the reason that a great thickness of concrete or the like is required to sustain this load. As distinguished from this, the float landing field of the present invention would only subject the roof structure to a load of ½ lb. per sq. ft., in view of the fact that the float is supported by a liquid medium such as water which distributed the load to the entire roof top or tank surface and assuming that the landing area is 100 ft. x 200 ft. or 20,000 sq. ft. The weight of the 10,000 lb. machine is uniformly distributed over 20,000 sq. ft.; namely, the roof structure would be subject to a load of only ½ lb. per sq. ft. instead of 3,300 lbs. per sq. ft. as heretofore.

For ease of manufacture, installation, repair and transportation, the float is preferably made in sections, means being provided to rigidly couple the sections together. For example, the sections may be 10 ft. x 10 ft. x 1 ft. thick. Assuming each float section weighs 300 lbs., each float section is pinned to adjoining float sections which would also support at least half the load. It appears therefore, that a 1 ft. thick float would handle aircraft up to 10,000 lb. gross weight.

In supporting a 10,000 lb. aircraft, about 160 cubic feet of water would have to be displaced. If the floats have all adjoining surfaces touching, then the displaced water will have to raise around the outer edges. On a 100 ft. x 200 ft. field with 4 in. of clearance around the edges, the volume available for the displaced water is 200 cubic feet, which would be the equivalent of a .01 inch displacement, about the thickness of a human hair, for the entire motion from completely empty to completely loaded with a 1,240,000 lb. load. Assuming a water depth of 1 foot, the roof load due to the tanks and water would be 65 lbs. per sq. ft. Completely loaded with aircraft it would be 128 lbs. per sq. ft.

For further details of the invention reference may be made to the drawing wherein Fig. 1 is a view in elevation, partly in section of a helicopter landing field according to the present invention.

Fig. 2 is an enlarged exploded plan view of two adjoining float sections, partly in section, with parts broken away.

Fig. 3 is an enlarged view in elevation, partly in section of the landing field of Fig. 1, with parts broken away.

Fig. 4 is an enlarged exploded vertical sectional view of two adjoining float sections with parts broken away.

Fig. 5 is an exploded perspective view of two adjoining float sections with parts broken away.

Referring in detail to the drawings, the structure I represents the roof top of a building. The side walls 2 and 3 of the building usually extend above the level of the roof as indicated at 4 and 5. According to the invention, the wall extensions 4 and 5 are similar extensions not shown for the other walls, as well as the roof top are provided with a suitable waterproof covering indicated at 6 so as to form a tank for water indicated at 7. The wall extensions do not have to be covered with the waterproof covering above the overflow level. The water may be supplied from a supply pipe 8 under control of a float valve 9 to maintain the water level at a suitable height. The wall extension 4 is provided with a recess 10 to house the float valve 9 at one side of the float 11, the recess 10 being comparatively narrow so that the float 11 cannot damage the float valve 9.

If due to rain or otherwise the level of the water should rise above a suitable amount, it can be drained by an overflow pipe 12.

The float 11 which serves as a landing field is in the form of a plurality of rigid units each like units 13 and 14 in Fig. 5. The units 13 and 14 are alike, the view showing the right end of unit 13 and the left end of unit 14. Further details of the unit construction are shown in Fig. 4. Each float unit like 13 and 14 comprises a rectangular box frame with supporting angles or bulkheads and intercostals of sufficient strength to support the necessary weight like 15. To one end of the frame like 15 is bolted a plurality of brackets like 16, three being shown and the other two being indicated at 17 and 18 in Fig. 5. Each of the brackets like 16 to 18 is arranged on the outside of its tank wall like 31 and each bracket like 16 to 18 is secured to the frame 15 by bolts like 19 and each such bracket comprises a plurality of outwardly extending spaced tongues like 20 each having an aperture like 21 and all apertures like 21 in a bracket being in alignment to receive a removable coupling pin 22. The left end of each float unit like 13 and 14 has suitably bolted or welded thereto by bolts 27, a companion coupling unit 23 having a plurality of spaced recesses like 24, one for each one of the tongues like 20, with intervening lugs like 25 with apertures 26 for coupling pin 22.

The tank units like 13 and 14 also have similar coupling devices at their opposite ends. For example, one end of the tank units like 13 may have a plurality such as three coupling units like 16 and the opposite end has companion coupling units like unit 23 in Fig. 4. The units like 13 and 14 are coupled together to form a rigid floating landing field of suitable size, the width of such field in the example shown in Fig. 1 being the width of five units. When the float sections are coupled together, their adjacent sides fit together to form a substantially continuous landing surface. This will be apparent from Figs. 2 and 4 wherein the brackets like 23 extend inside of its tank unit like 14 inwardly of its outer wall like 32 and such brackets are recessed to receive the brackets like 16 so that the upright wall 31 of section 13 will fit against the upright wall 32 of the section 14. The float sections are interchangeable as they are all alike and can be handled as separate units for ease of transportation, installation and repair.

Around the margin of the floating landing field 11 the tongue brackets like 16 are not needed for coupling to other float units and such tongue brackets may be removed or they may be left in place to serve as spacers to prevent the float 11 from contacting the sides of the tank 6.

The water in the tank may be provided with an anti-freeze solution and with chlorine to prevent the formation of algae.

It will be apparent therefore, that the invention provides a floating landing field for aircraft and more particularly a floating landing field made up of floating sections.

Various modifications may be made in the invention without departing from the spirit of the following claims.

I claim:

1. A helicopter landing field comprising a building structure and means for distributing the weight or force of a helicopter landing on the roof of such structure, said means comprising a tank of liquid resting on and supported by said roof and a rigid floating helicopter landing field for said tank, whereby the weight or force of the helicopter on said landing field is distributed throughout the area of said roof under said tank.

2. A helicopter landing field comprising a building structure having a roof, a water-proof water tank on said roof and a floating landing field in said tank, said landing field comprising a plurality of rectangular floating sections and means for removably and rigidly coupling said sections together.

3. A floating landing field comprising a plurality of rectangular float sections each having an upright wall, a bracket fixed to the upright wall of one of said sections, said bracket having outwardly extending vertically spaced tongues having aligned apertures, another of said sections having a bracket behind its said upright wall and having corresponding vertically spaced grooves in which said tongues fit with intervening lugs having aligned apertures, said grooves and lugs of the bracket of said other section inwardly extending from and terminating at their outer ends behind its associated said upright wall, said tongues fitting in said grooves with the apertures of said tongues and lugs in alignment and with the adjacent said walls of said sections fitting together in abutting relationship, and a coupling pin fitting said aligned apertures and rigidly coupling said sections with their adjacent said walls fitting together.

4. A floating landing field comprising a hollow box-like metal float section having an upright wall, a coupling member secured to said float section and extending outwardly from said wall, a cooperating similar float section having an upright wall and having a cooperating coupling member behind and inwardly extending from its said wall and means for removably coupling said members together with said walls fitting together in abutting relation.

5. A floating landing field comprising a plurality of rectangular float sections each having an upright wall, a plurality of laterally spaced brackets outside of and fixed to the upright wall of one of said sections, each of said brackets having outwardly extending vertically spaced tongues having vertically aligned apertures, another of said sections having a corresponding plurality of laterally spaced brackets behind its said upright wall and each having corresponding vertically spaced grooves in which the tongues of one of said first mentioned brackets fit with intervening lugs having vertically aligned apertures, said grooves and lugs of each bracket of said other section inwardly extending from and terminating at their outer ends behind its associated said upright wall, said tongues of each of said first mentioned brackets fitting in the grooves of one of said other brackets with the apertures of the corresponding tongues and lugs in vertical alignment and with the adjacent said walls of said section fitting together in abutting relationship, and coupling pins each fitting the aligned apertures of the corresponding brackets of said sections and rigidly coupling said sections with their adjacent said walls fitting together.

6. A floating landing field comprising a hollow box-like float section having a frame having an upright wall, a coupling member secured to said frame and extending outwardly from said wall, a cooperating similar float section having a frame having an upright wall, and a cooperating coupling member fixed to said last mentioned frame behind and inwardly extending from its said wall and means for removably coupling said members together with said walls fitting together in abutting relation.

References Cited in the file of this patent

UNITED STATES PATENTS

| Number | Name | Date |
|---|---|---|
| 289,557 | Reinecke | Dec. 4, 1883 |
| 1,763,782 | Henderson et al. | June 17, 1930 |
| 1,843,640 | Jackson | Feb. 2, 1932 |
| 1,885,889 | Beam | Nov. 1, 1932 |
| 2,157,959 | Knight | May 9, 1939 |
| 2,430,178 | Kurfiss | Nov. 4, 1947 |
| 2,518,091 | Stopkevyc | Aug. 8, 1950 |
| 2,565,369 | Hamilton | Aug. 21, 1951 |
| 2,605,733 | Smith | Aug. 5, 1952 |

FOREIGN PATENTS

| Number | Country | Date |
|---|---|---|
| 684,951 | France | Mar. 25, 1930 |

OTHER REFERENCES

Engineering News-Record, April 20, 1944, pages 78, 79, 90.